US012560300B2

(12) United States Patent
Haut et al.

(10) Patent No.: US 12,560,300 B2
(45) Date of Patent: Feb. 24, 2026

(54) LIGHTING DEVICE FOR VEHICLES AND PRODUCTION METHOD

(71) Applicant: HELLA GmbH & Co. KGaA, Lippstadt (DE)

(72) Inventors: Dietmar Haut, Lippstadt (DE); Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/916,666

(22) Filed: Oct. 15, 2024

(65) Prior Publication Data

US 2025/0035281 A1 Jan. 30, 2025

Related U.S. Application Data

(63) Continuation of application No. PCT/EP2023/057933, filed on Mar. 28, 2023.

(30) Foreign Application Priority Data

Apr. 14, 2022 (DE) ..................... 10 2022 109 228.3

(51) Int. Cl.
*F21S 43/20* (2018.01)
*F21S 41/37* (2018.01)
*G02B 5/02* (2006.01)

(52) U.S. Cl.
CPC ......... *F21S 43/26271* (2024.05); *F21S 41/37* (2018.01); *F21S 43/26241* (2024.05); *G02B 5/021* (2013.01); *G02B 5/0231* (2013.01); *F21S 2243/00* (2024.05)

(58) Field of Classification Search
CPC ........... F21S 43/26271; F21S 43/26241; F21S 41/37; G02B 5/021; G02B 5/0231
See application file for complete search history.

(56) References Cited

U.S. PATENT DOCUMENTS

| | | | | |
|---|---|---|---|---|
| 6,352,359 | B1 * | 3/2002 | Shie ........................ | F21S 43/26 362/334 |
| 7,653,279 | B1 * | 1/2010 | Jacobsen ................. | G03F 7/201 385/129 |
| 2004/0056370 | A1 | 3/2004 | Bachl et al. | |
| 2008/0014410 | A1 * | 1/2008 | Johnston ................. | G02B 5/30 428/397 |

(Continued)

FOREIGN PATENT DOCUMENTS

| | | |
|---|---|---|
| DE | 10055799 A1 | 5/2002 |
| DE | 102008005488 A1 | 7/2009 |

(Continued)

OTHER PUBLICATIONS

International Search Report for International Application PCT/EP2023/057933 mailed Aug. 31, 2023.

*Primary Examiner* — Christopher E Dunay
(74) *Attorney, Agent, or Firm* — Muncy, Geissler, Olds & Lowe, P.C.

(57) ABSTRACT

A lighting device for vehicles, comprising a housing containing a light source and an optical unit. The optical unit has a microstructured surface having a plurality of microstructure elements. The microstructure elements are formed from a limited selection of microstructure elements formed differently in at least two extension directions of the surface.

11 Claims, 3 Drawing Sheets

(56) References Cited

U.S. PATENT DOCUMENTS

| | | | | |
|---|---|---|---|---|
| 2009/0179418 A1* | 7/2009 | Stalder | .................. | B42D 25/29 |
| | | | | 283/85 |
| 2009/0297773 A1* | 12/2009 | Wang | .................. | G02B 5/0226 |
| | | | | 428/141 |
| 2011/0279015 A1* | 11/2011 | Negley | .................. | F21K 9/233 |
| | | | | 313/501 |
| 2012/0268940 A1* | 10/2012 | Sahlin | .................... | F21S 43/26 |
| | | | | 362/342 |
| 2022/0299187 A1 | 9/2022 | Muegge et al. | | |

FOREIGN PATENT DOCUMENTS

| | | | |
|---|---|---|---|
| DE | 202010002744 U1 | 8/2010 |
| DE | 102010027322 A1 | 1/2012 |
| DE | 102015001609 A1 | 8/2016 |
| DE | 102018105958 A1 | 9/2019 |
| DE | 102019125640 A1 | 3/2021 |
| DE | 102019133693 A1 | 6/2021 |
| EP | 2587125 A2 | 10/2012 |
| EP | 3091273 A1 | 5/2015 |
| EP | 3636993 A1 | 8/2019 |
| EP | 3647833 A1 | 10/2019 |
| WO | WO 2015031925 A1 | 3/2015 |
| WO | WO 2021180549 A1 | 9/2021 |

* cited by examiner

LIGHTING DEVICE FOR VEHICLES AND PRODUCTION METHOD

This nonprovisional application is a continuation of International Application No. PCT/EP2023/057933, which was filed on Mar. 28, 2023, and which claims priority to German Patent Application No. 10 2022 109 228.3, which was filed in Germany on Apr. 14, 2022, and which are both herein incorporated by reference.

BACKGROUND OF THE INVENTION

Field of the Invention

The present invention relates to a lighting device for vehicles, comprising a housing containing a light source and an optical unit, wherein the optical unit has a microstructured surface having a plurality of microstructure elements.

Description of the Background Art

In addition, the invention relates to a method for producing optical components of lamps and headlamps for vehicles with a microstructured surface by means of injection molding, having the following steps: provision of an injection mold that has a mold surface having a microstructure.

In addition, the invention relates to a tool insert and to a method for producing the tool insert.

Lighting devices for vehicles having a light source and an optical unit are known from, for example, DE 10 2019 133 693 A1, which corresponds to US 2022/0299187, which is incorporated herein by reference. The optical unit of the lighting device has a planar light guide that has a microstructured surface with a multiplicity of microstructure elements. The optical component is produced by injection molding, wherein microstructure elements in a negative form are created on the surface of a tool insert of the injection mold by a lithographic process. Templates of the microstructure elements are transferred to the tool insert by means of an electrochemical (galvanic) process.

It is known from DE 10 2018 105 958 A1, which is incorporated herein by reference, to apply the microstructured surface of the injection mold by an electrochemical machining process. This production process has proven itself in the production of identical, regularly arranged microstructure elements. If the microstructure elements are to have different shapes, in particular different curvatures, in an extension plane of a surface of the optical component that is formed by them, then production is not at all possible or only with difficulty.

A method is known from DE 100 55 799 A1, which corresponds to US 2004/0056370, for producing light guides in which punctiform elevations on a surface of the light guide are produced by injection molding. For this purpose, punctiform depressions are introduced as negative structures in a surface of a tool insert of the injection mold by laser machining. The punctiform depressions have the same dimensions. No provision is made to introduce differently dimensioned depressions.

SUMMARY OF THE INVENTION

It is therefore an object of the present invention to provide a lighting device and a method for producing optical components such that a microstructuring can be produced on an optical component of the lighting device in a manner that is simpler and faster in manufacturing terms.

To attain this object, the invention is characterized in that the microstructure elements can be formed from a limited selection of microstructure elements that are differently designed in at least two extension directions of the surface.

The invention advantageously makes possible the production of a microstructured surface of an optical component, wherein microstructure elements have a fixed, specified varying design and/or varying shaping and/or varying dimension. The surface of the optical component is composed of a fixed, specified number of differently shaped microstructure elements, by which means a specified scattering behavior or a specified lighting function can be created when the optical component is, e.g., a lens or lamp lens. The different microstructure elements cause a different scattering behavior, so that different scattering behaviors and thus different lighting functions, as for example taillight, brake light, daytime running light, directional indicator, can be created by selecting a number of differently shaped microstructure elements. Depending on the lighting function to be created, differently shaped microstructure elements are combined or grouped. Advantageously, a number of different lighting functions can be created by a limited number of different micro-optical elements.

The selection of different microstructure elements includes a number of microstructure elements that have upright, opposite, parallel walls, wherein the upright, parallel walls extend at least partially in a straight line and/or in an arc in at least one extension direction of the surface. Different geometries of microstructure elements can be formed in a simple manner as a result, leading to a variability in the creation of lighting functions.

The microstructure elements extend linearly and/or in a Y-shape and/or in a U-shape and/or in a C-shape and/or in an L-shape and/or in a V-shape. Different scattering behaviors can be created in a simple manner by the defined selection of specific microstructure geometries.

According to an improvement of the invention, the microstructured surface of the optical component includes multiple identical subsections, wherein the subsections each can have a number of identical and/or mutually different microstructure elements. Small and large microstructured surfaces can advantageously be created with little control effort in this way.

A change in a length and/or a width and/or a depth of the microstructure elements, preferably all of the microstructure elements, results in a changed scattering behavior and thus in changed lighting functions. The desired scattering behavior can advantageously be set by changing just one or several of these parameters. The shape pattern of the microstructure elements is always the same in this case so that the control effort for a laser device to create the mold surface is low.

To attain the object, the method according to the invention is characterized by the introduction of selected, differently designed microstructure elements into the mold surface in an extension plane of the mold surface by means of laser machining, and injection molding of the optical components with the formation of the microstructure elements in the surface of the optical components.

Advantageously, the method according to the invention makes possible a simple and rapid production of microstructured surfaces of an optical component in which a specified scattering behavior of the surface of the optical component can be created as a function of the selection of microstructure elements from microstructure elements having a fixed, specified number of different geometries. Different scattering behaviors or scattering patterns can be generated by means of the fixed and defined number of differently shaped microstructure elements. The microstructure elements are shaped differently in such a manner that a specified number of different scattering patterns or light distributions of the lighting device can be created by putting together a limited number of different microstructure elements. In this way, different light distributions, as for example daytime running light, brake light, taillight, directional indicator, can be created, wherein the scattering or the light distribution can be changed in a customer-specific manner to a limited extent by changing the shape of at least one microstructure element.

A multiplicity of identically differently designed microstructure elements are applied sequentially to a mold surface so that the mold surface (section) formed of a number of identical subsections that each have the same number and/or arrangement of different microstructure elements. In this way, the mold surface advantageously includes a regular structure that exists owing to repeated laser application of subsections formed of multiple microstructure elements.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
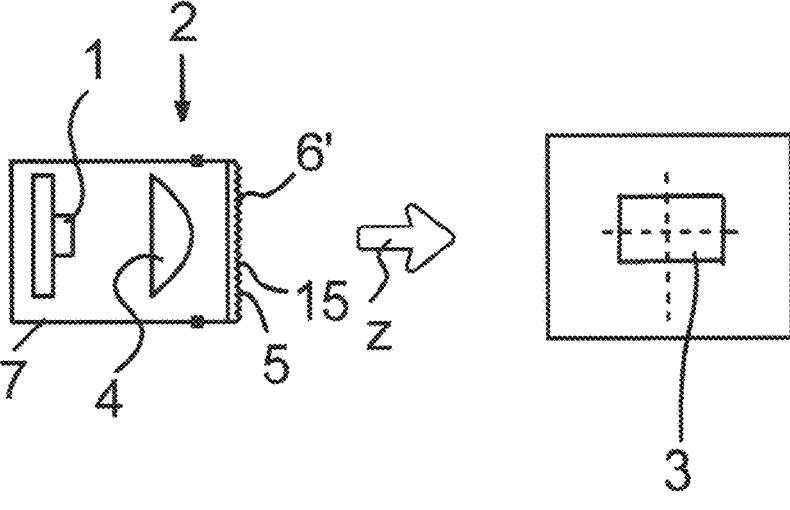
FIG. 1 is a schematic representation of a lighting device.
Figure 2:
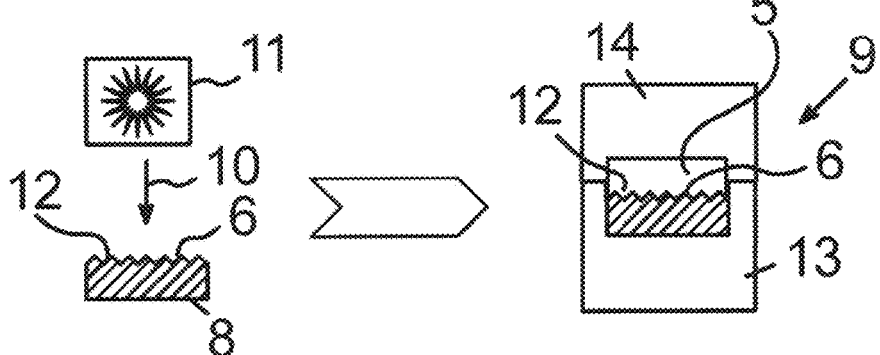
FIG. 2 is a schematic representation of an injection mold for producing an optical component containing a microstructured surface.

In FIG. 1, a lighting device for vehicles that includes a light source 1 and an optical unit 2 for creating a specified light distribution 3 is shown schematically.

The optical unit 2 includes, firstly, a lens arrangement 4, which is designed as, e.g., the primary optics of the light source 1. In addition, the optical unit 2 includes a lamp lens 5 whose surface has a microstructure 6'. The microstructure 6' is formed by a multiplicity of microstructure elements, which are described in detail below.

The lens arrangement 4 and the light source 1 are arranged inside a housing 7 of the lighting device, which can be designed as a rear lamp, for example. The lamp lens 5 serves as a cover plate that simultaneously seals or covers an opening of the housing 7 in the direction of light emission.

In the present example, the light distribution 3 serves to create a taillight function. Alternatively, the lighting device can also serve to create other signaling functions, as for example position light, brake light, directional indicator light, and daytime running light.

The microstructure elements scatter the light from the light source 1 in such a manner that the desired rectangular or elliptical light distribution 3 is generated. The light scattering takes place in the horizontal and vertical directions.

In the present example, the lamp lens 5 is plate-like and flat in design. Alternatively, the lamp lens 5 can also be arched in design, which is to say provided with a certain curvature.

The lamp lens 5 is produced as an optical component by injection molding. For this purpose, a tool insert 8 of an injection mold 9 is processed by a laser beam 10 of a laser device 11 in such a manner that a microstructure 6 containing a multiplicity of microstructure elements is formed on a surface 12 of the tool insert 8. The mold surface 12 constitutes a negative form of the microstructure 6' of the lamp lens 5 to be injection molded.

Once the tool insert 8 is placed in a first mold half 13 of the injection mold 9, wherein the structured surface 12 is arranged on a side facing a second mold half 14, the lamp lens 5 can be injection molded by bringing together the first mold half 13 and the second mold half 14 to close a mold space. The plastic mass injected into the mold space is deposited on the tool insert surface 12. After cooling of the plastic mass, the injection-molded lamp lens 5 can be ejected in a known manner. After assembly into the lighting device, the thus completed lamp lens 5 has the microstructure 6', which constitutes a positive form of the microstructure 6 of the tool insert 8, on an outer surface 15.

Figure 3:
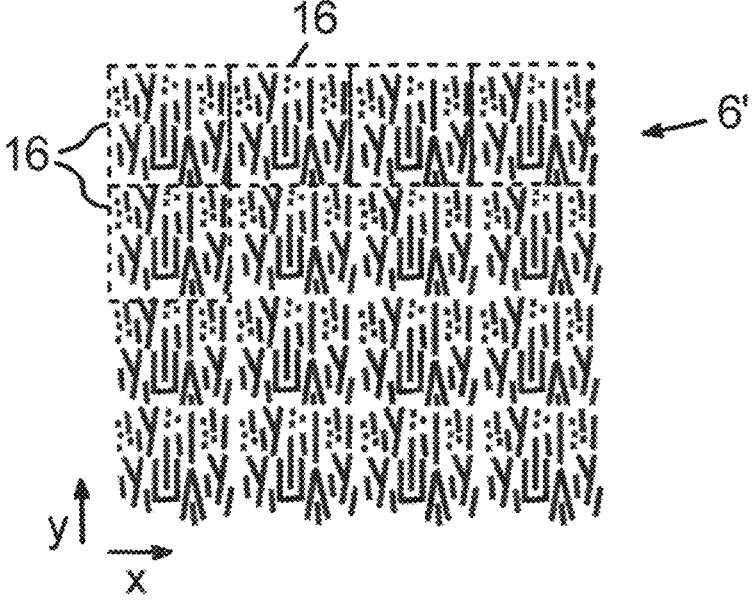
FIG. 3 is a top view of a microstructured surface of the optical component formed of multiple subsections containing the same microstructure elements.
Figure 4:
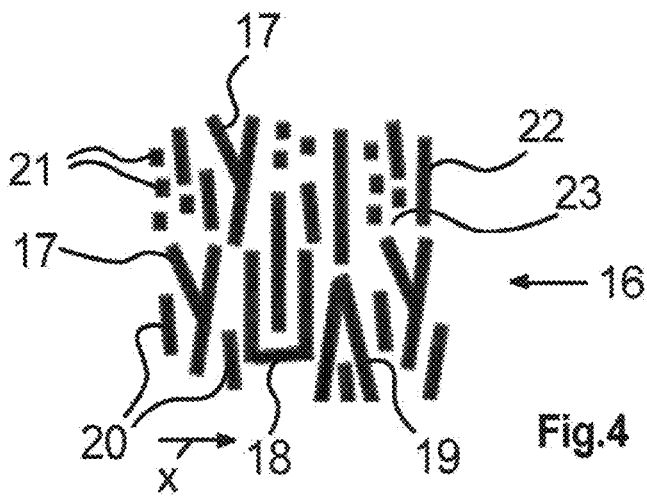
FIG. 4 is an enlarged representation of a subsection according to FIG. 3.

A top view of the microstructure 6' is shown in FIG. 3. It is evident that the surface of the lamp lens 5 is composed of a multiplicity of identical subsections 16 (shown dashed) that each have the same number and arrangement and design of different microstructure elements 17, 18, 19, 20, 21. The subsections 16 extend in an xy-plane (extension plane), which is perpendicular to the direction of light emission z. Shown enlarged in FIG. 4 is a subsection 16. It contains different types of microstructure elements, namely Y-shaped microstructure elements 17, U-shaped microstructure elements 18, V-shaped microstructure elements 19, linear microstructure elements 20, and punctiform microstructure elements 21. The subsection 16 has a total of three of the Y-shaped microstructure elements 17. The subsection 16 has a single one of the U-shaped microstructure elements 18. The subsection 16 has a single one of the V-shaped microstructure elements 19. The subsection 16 has a total of twelve of the linear microstructure elements 20, which are distributed throughout the subsection 16 and have identical and/or different lengths. Furthermore, the subsection 16 has punctiform microstructure elements 21.

The subsection has a dimension in the range between 50 μm×50 μm and 300 μm×300 μm.

Figure 5A:
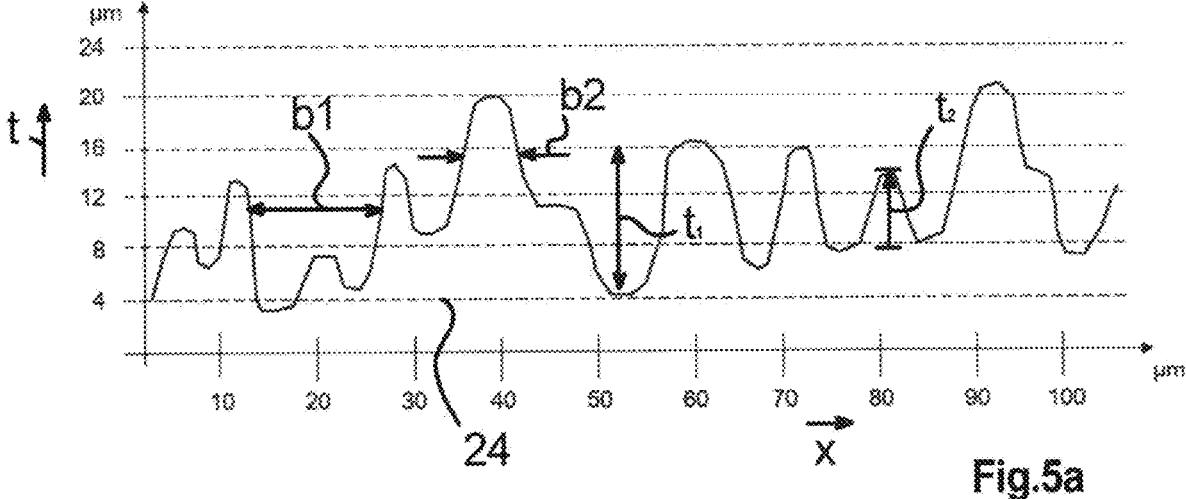
FIG. 5a is a cross-sectional profile through at least one subsection of the microstructured surface of the optical component.

The subsections 16 contain the multiplicity of microstructure elements 17, 18, 19, 20, 21, and are equal in size. They are arranged side by side in the manner of a grid. A cross-sectional profile through the subsection 16 in the X-direction is shown in FIG. 5a. The black markings shown in FIG. 3 and FIG. 4 represent elevations 22 of the microstructure elements 17, 18, 19, 20, 21 and the white markings or spaces between the elevations 22 represent depressions 23 in the microstructure 6' thus formed. Shown in FIG. 5a is a profile image of the subsection 16. It is evident that the microstructure elements 17, 18, 19, 20, 21 or the distances (widths b1) of the elevations 22 from the Y-shaped microstructure elements 17 or widths b2 of the elevations 22 of the U-shaped microstructure elements 18, V-shaped microstructure elements 19 are in a range of less than 20 μm. The linear microstructure elements 20 form elevations 22 with a width less than 5 μm. A depth $t_1$ is in the range from 5 μm to 12 μm.

The elevations 22 of the microstructure elements 17, 18, 19, 20, 21 form upright walls that are raised compared with a base surface 24 of the lamp lens 5. In the present example, these elevations 22 or walls extend essentially in a straight line, wherein the U-shaped microstructure element 18, for example, is composed of three straight-line elevations 20.

According to an example, the elevations 22 can additionally or alternatively extend in an arc. What is essential is that the microstructure elements 17, 18, 19, 20, 21 are put together in the subsection 16 in such a manner that the lamp lens 5 in the assembled state has a specified scattering behavior or scattering pattern so that the desired light distribution 3 is projected in cooperation with, for example, the lens arrangement 4.

According to an example, the optical unit 2 can also be composed solely of the lamp lens 5, which provides for the desired scattering behavior and thus the desired light distribution 3.

According to the invention, the desired scattering behavior can be created by the selection of a specific number of different microstructure elements 17, 18, 19, 20, 21.

Figure 5B:
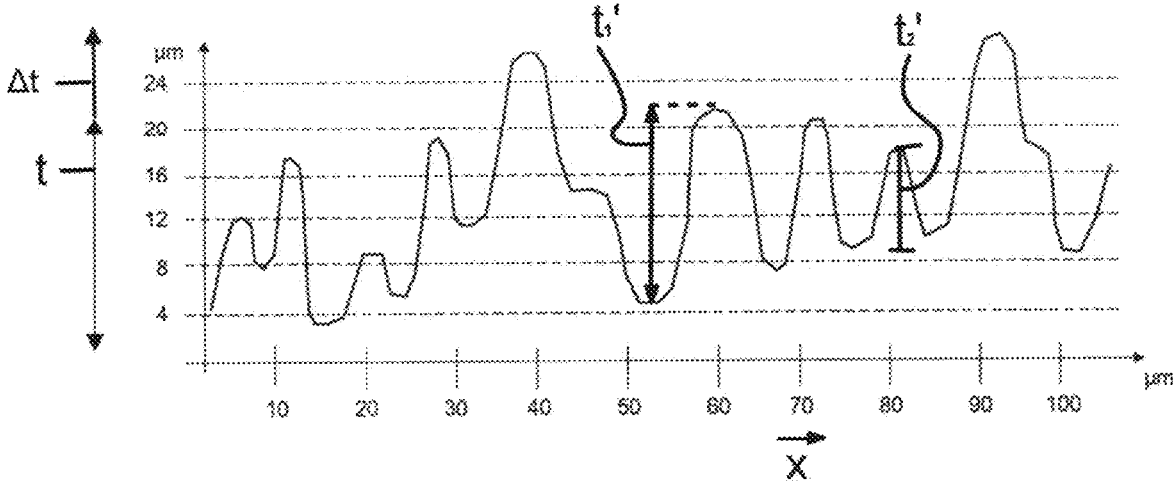
FIG. 5b is a cross-sectional profile through at least one subsection of the microstructured surface of the optical component, wherein a depth of the microstructure elements has been enlarged in comparison with FIG. 5a, FIG. 5c is a cross-sectional profile through at least one subsection of the microstructured surface of the optical component, wherein a depth of the microstructure elements has been reduced in comparison with FIG. 5a, and FIG. 5d is a cross-sectional profile through at least one subsection of the microstructured surface of the optical component, wherein the distance between the microstructure elements has been reduced in a preferred direction x.

According to an example of the lamp lens 6, the same microstructure 6' as shown in FIGS. 3 and 4 can be introduced into the tool insert 8 by controlling the laser device 11, with the difference that the microstructure 6 has an increased depth t, which is to say a depth t increased by Δt in comparison with the microstructure 6' from FIG. 5a. The lamp lenses 5 injection molded with such a modified tool insert 8 then have a cross section according to FIG. 5b, in which the depth $t_1'$ or $t_2'$ is greater than the depth $t_1$ or $t_2$ according to the microstructures 6 from FIG. 5a. The arrangement of the microstructure elements 17, 18, 19, 20, 21 in the respective subsection 16 has remained the same in this case. Advantageously, a different scattering behavior can be created by the change in depth, which can result in a different lighting function.

Figure 5C:
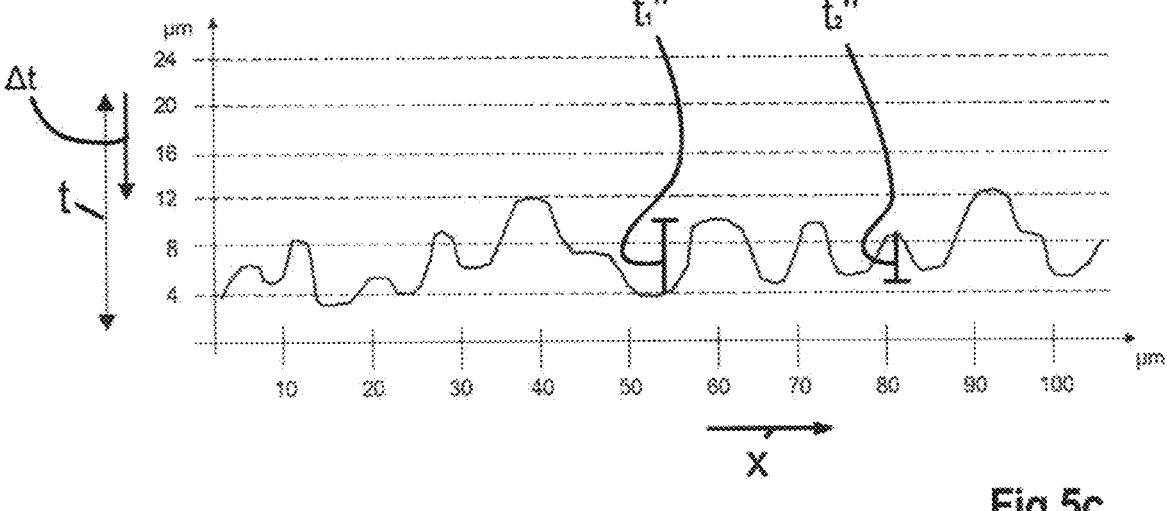

Alternatively, the depth t of the microstructure 6' can also be reduced by Δt in comparison with the microstructure 6' from FIG. 5a, as is shown in FIG. 5c; see the reduced depths $t_1''$, $t_2''$ by way of example. Another modified scattering behavior occurs as a result.

In FIG. 3, the subsections 16 are arranged in mutually perpendicular extension directions x and y in the manner of a grid.

Figure 5D:
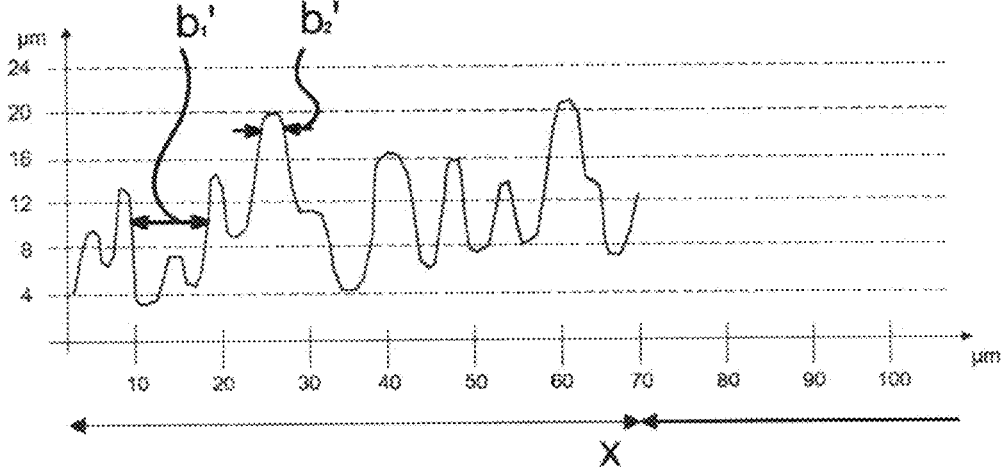

According to an example of the invention from FIG. 5d, the microstructure 6' can be compressed, wherein a width b of the microstructure elements 17, 18, 19, 20, 21 is reduced.

A width b1' and b2' of the microstructure elements 17, 18 is smaller in comparison with the width b1 or b2 in FIG. 5a. As a result, a changed scattering behavior is created, which can serve to project a further lighting function.

The different microstructures can be created in a simple manner by appropriate controlling of the laser device 11. For different lighting functions, therefore, different tool inserts 8 can be generated that can be placed in the injection mold 9 as a function of light distributions 3 to be created.

If the tool insert 8 and the laser device 11 are mounted on multiple axes, then curved or arched lamp lenses 5 can also be created with an arched or curved microstructure 6'.

According to an example of the invention that is not shown, instead of the lamp lens 5, the optical component can be designed as a light guide or as a reflector that has the microstructure 6' on a lateral surface or flat face.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a vehicle, the lighting device comprising:
   a housing;
   a light source arranged in the housing; and
   an optical unit having a microstructured surface having a plurality of microstructure elements that are differently designed in at least two extension directions of the microstructured surface,
   wherein the microstructure elements include Y-shaped microstructure elements, U-shaped microstructure elements, V-shaped microstructure elements, linear microstructure elements and punctiform microstructure elements.

2. The lighting device according to claim 1, wherein the microstructure elements have elevations that extend at least partially in a straight line and/or in an arc in at least one extension direction.

3. The lighting device according to claim 2, wherein a distance of adjacent elevations from one another and/or a length of the microstructure elements and/or a depth of the microstructure elements is formed such that a light emitted by the optical unit has a specified scattering pattern.

4. The lighting device according to claim 1, wherein a subsection of the microstructured surface has a specified number of different microstructure elements and a specified arrangement of identical and/or different microstructure elements, and wherein the microstructured surface comprises a plurality of identically designed subsections.

5. The lighting device according to claim 4, wherein the subsection has a rectangular or square size in the range between 50 μm×50 μm and 300 μm×300 μm.

6. The lighting device according to claim 1, wherein the optical unit includes a light guide and/or a lamp lens and/or a reflector that has the microstructured surface.

7. A tool insert for an injection mold for injection molding an optical component according to claim 1, wherein a laser device and the tool insert are mounted on multiple axes such that the different microstructure elements are introduced onto a curved mold surface by laser machining.

8. A method for producing an optical component of a lamp or headlamp for a vehicle having a microstructured surface via injection molding, the method comprising:
   providing an injection mold that has a tool surface having a microstructure;

introducing into the mold surface, via laser machining, selected microstructure elements that are differently designed in an extension plane of the mold surface; and injection molding the optical components with a formation of the microstructure elements in a surface of the optical component, wherein the selected microstructure elements include Y-shaped microstructure elements, U-shaped microstructure elements, V-shaped microstructure elements, linear microstructure elements and punctiform microstructure elements.

9. The method according to claim 8, wherein a plurality of identically differently designed microstructure elements is introduced sequentially into the mold surface so that the mold surface is formed of a number of identical subsections that each have the same number and/or arrangement of different microstructure elements.

10. The method according to claim 8, wherein a laser device for laser machining the mold surface is controlled such that a dimension of one and/or multiple microstructure elements and/or a dimension of the subsections is varied such that the optical component produced, in cooperation with a light source, emits light with a specified scattering pattern.

11. A method for producing a tool insert for injection molding an optical component containing a microstructured surface, wherein a number of microstructure elements that are differently dimensioned in an extension plane of the tool insert are introduced into a surface of the same via laser machining, the microstructure elements including Y-shaped microstructure elements, U-shaped microstructure elements, V-shaped microstructure elements, linear microstructure elements and punctiform microstructure elements.

* * * * *